(12) United States Patent
Kawada et al.

(10) Patent No.: US 6,409,004 B1
(45) Date of Patent: Jun. 25, 2002

(54) ELECTROMAGNETIC CLUTCH

(75) Inventors: Minoru Kawada; Ryuhei Tanigaki, both of Nishi-biwajima-machi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 13 days.

(21) Appl. No.: 09/635,092

(22) Filed: Aug. 9, 2000

(30) Foreign Application Priority Data

Jan. 14, 2000 (JP) ........................................ 2000-006577

(51) Int. Cl.[7] ............................................. F16D 27/112
(52) U.S. Cl. .............................. 192/84.961; 192/107 R
(58) Field of Search ..................... 335/281; 192/84.961, 192/84.96, 84.9, 107 R

(56) References Cited

U.S. PATENT DOCUMENTS

| 4,632,236 A | * | 12/1986 | Koitabashi | 192/84.961 |
| 4,892,176 A | | 1/1990 | Takashi et al. | |
| 4,958,712 A | * | 9/1990 | Suganuma et al. | 192/84.961 X |
| 5,078,248 A | * | 1/1992 | Yesnik | 192/84.961 |
| 5,232,076 A | * | 8/1993 | Nakagawa et al. | 192/84.961 X |
| 5,617,941 A | * | 4/1997 | Takahashi et al. | 192/107 R |

FOREIGN PATENT DOCUMENTS

| DE | 1 475 414 | 6/1969 |
| EP | 0 351 098 | 1/1990 |
| EP | 0 404 139 | 12/1990 |

OTHER PUBLICATIONS

Copy of European Patent Office Communication, including European Search Report, for corresponding European Patent Application No. 00117105 dated Mar. 26, 2001.

* cited by examiner

Primary Examiner—Rodney H. Bonck
(74) Attorney, Agent, or Firm—Armstrong, Westerman & Hattori, LLP

(57) ABSTRACT

An electromagnetic clutch comprises a clutch rotor having a flange portion, an armature opposed to the flange portion, and a ring exciting coil. The ring exciting coil generates a magnetic flux for attracting the armature to the flange portion when it is supplied with current. The flange portion is formed having outside slits and inside slits. A magnetic pole portion on the outer peripheral side and a magnetic pole portion on the inner peripheral side are formed between the outside slits and the inside slits. A step portion and a concave surface continuous with the step portion are formed in a region corresponding to the magnetic pole portion on the outer peripheral side. The step portion serves to restrain the magnetic pole portion from touching the armature when the magnetic flux is formed.

6 Claims, 5 Drawing Sheets

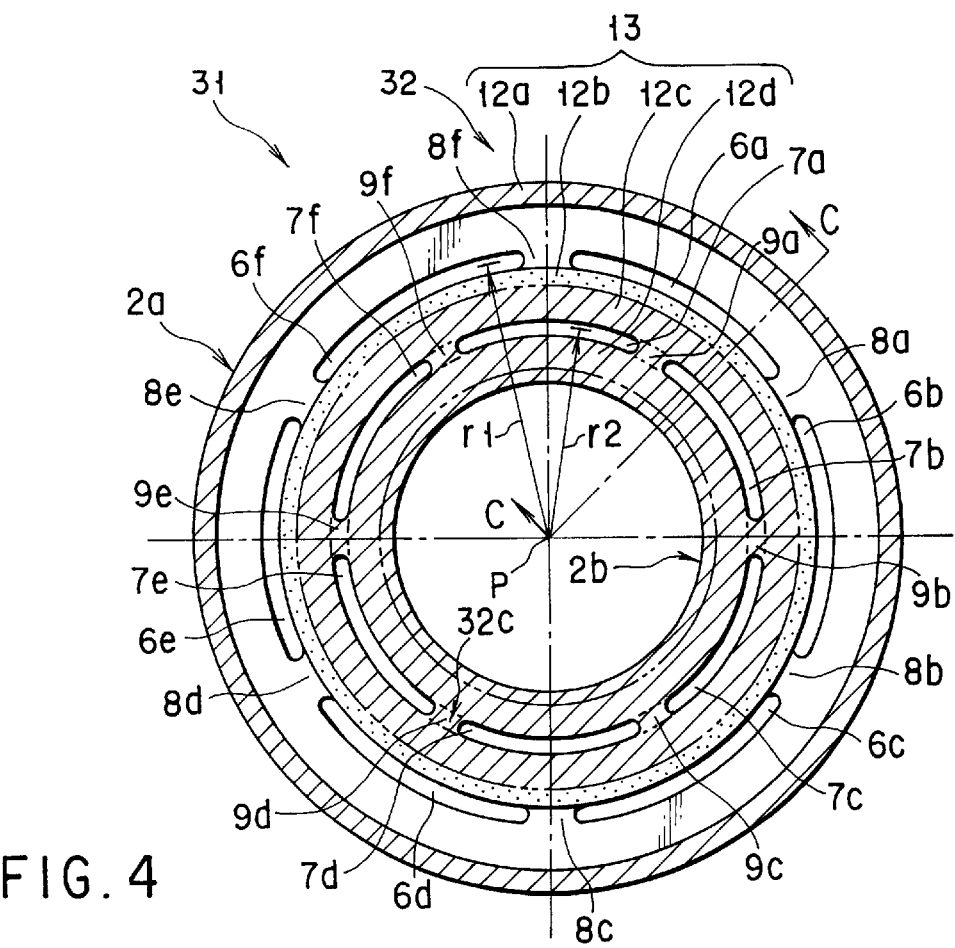
FIG. 4
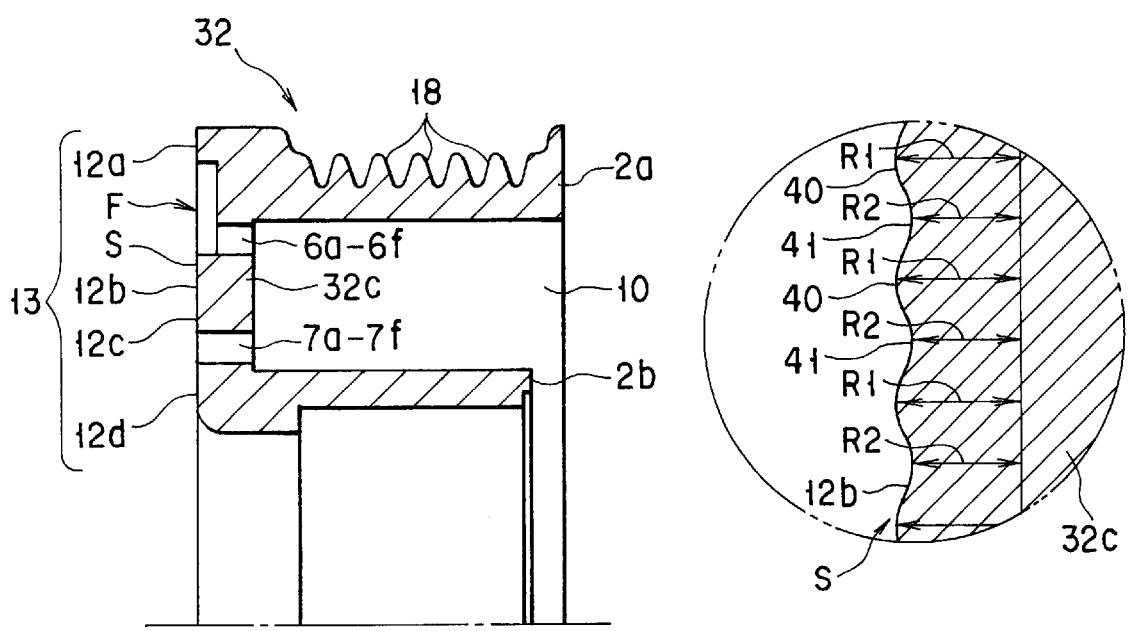
FIG. 5A
FIG. 5B

ELECTROMAGNETIC CLUTCH

CROSS-REFERENCE TO RELATED APPLICATIONS

This application is based upon and claims the benefit of priority from the prior Japanese Patent Application No. 2000-006577, filed Jan. 14, 2000, the entire contents of which are incorporated herein by reference.

BACKGROUND OF THE INVENTION

The present invention relates to an electromagnetic clutch used in, for example, an automotive air conditioner.

DESCRIPTION OF THE RELATED ART

An electromagnetic clutch that can alternatively select transmittal or non-transmittal of power by means of electromagnetic force is constructed in the manner shown in FIG. 7, for example. The electromagnetic clutch 101 comprises a clutch rotor 102 rotatable by means of an external drive source (not shown), ring armature 103 opposed to one end face of the rotor 102, ring exciting coil 104, ring field 105 containing the coil 104, return spring 113, etc. FIG. 7 shows a state in which current is supplied to the ring exciting coil 104 to generate a magnetic flux M that is diagrammatically indicated by a broken line.

As shown in FIG. 9, the clutch rotor 102 includes can outer tube portion 102a, an inner tube portion 102b, and a flange portion 102c that connects the tube portions 102a and 102b. The flange portion 102c is provided on one end portion of the clutch rotor 102 that faces the armature 103. The front face of the flange portion 102c serves as a friction surface that touches the armature 103.

As shown in FIG. 8, the flange portion 102c of the clutch rotor 102 is formed having arcuate outside slits 106a, 106b, 106c, 106d, 106e and 106f and arcuate inside slits 107a, 107b, 107c, 107d, 107e and 107f. Outside bridge portions 108a to 108f are arranged individually between the adjacent outside slits 106a to 106f. The outer peripheral portion of the flange portion 102c is supported on one end portion of the outer tube portion 102a by means of the bridge portions 108a to 108f. Further, inside bridge portions 109a to 109f are arranged individually between the adjacent inside slits 107a to 107f. The inner peripheral portion of the flange portion 102c is supported on one end portion of the inner tube portion 102b by means of the bridge portions 109a to 109f.

When current is supplied from an external power source (not shown) to the exciting coil 104, the coil 104 generates the magnetic flux M, as shown in FIG. 7. The armature 103 is attracted to an end face of the clutch rotor 102 by means of an electromagnetic force based on the magnetic flux M. Thus, the rotor 102 and the armature 103 are connected magnetically to each other. When current supply to the coil 104 is interrupted, the magnetic flux M dies out, so that the armature 103 is separated from the end face of the rotor 102 by means of the elastic force of the return spring 113. The coil 104 is held in the ring field 105. The field 105 is held in a ring groove 110 that is defined by the respective inner surfaces of the outer tube portion 102a, inner tube portion 102b, and flange portion 102c.

As shown in FIG. 7, the magnetic flux M gets out of the ring field 105 and gets into the outer tube portion 102a through a gap 111a between the field 105 and the outer tube portion 102a. The magnetic flux M in the outer tube portion 102a gets into the armature 103 through a first junction 111b between the clutch rotor 102 and the armature 103. The magnetic flux M in the armature 103 gets into the flange portion 102c through a second junction 111c between the armature 103 and the flange portion 102c. The magnetic flux M in the flange portion 102c gets again into the armature 103 through a third junction 111d between the flange portion 102c and the armature 103. The flux M in the armature 103 gets into the inner tube portion 102b through a fourth junction 111e between the armature 103 and the inner tube portion 102b. The flux M in the inner tube portion 102b returns to the ring field 105 through a gap 111f between the inner tube portion 102b and the field 105. Thus, a closed magnetic circuit is formed in the clutch rotor 102 and the armature 103.

When this magnetic circuit is formed in this manner, the clutch rotor 102 and the armature 103 frictionally engage each other in a manner such that their respective opposite surfaces are at least partially in contact with each other. This frictional engagement causes the rotor 102 and the armature 103 to rotate integrally with each other, whereupon power is transferred between them. When the power supply to the exciting coil 104 is interrupted, the magnetic flux M is canceled, so that the armature 103 is separated from the clutch rotor 102, whereupon the power transmittal is interrupted.

When the clutch rotor 102 and the armature 103 are connected magnetically to each other, first, second, third, and fourth magnetic pole portions 112a, 112b, 112c and 112d are formed on the rotor 102, ranging successively from the outer peripheral side to the inner peripheral side in the radial direction, as shown in FIGS. 8 and 9. The second magnetic pole portion 112b is supported on the outer tube portion 102a by means of the outside bridge portions 108a to 108f. The third magnetic pole portion 112c is supported on the inner tube portion 102b by means of the inside bridge portions 109a to 109f. The first magnetic pole portion 112a is supported on the outer tube portion 102a throughout its circumference. The fourth magnetic pole portion 112d is supported on the inner tube portion 102b throughout its circumference. Thus, the second and third magnetic pole portions 112b and 112c are lower in stiffness than the first and fourth magnetic pole portions 112a and 112d. Besides, the second and third magnetic pole portions 112b and 112c are formed on the flange portion 102c that is thinner than the tube portions 102a and 102b. The thin-walled flange portion 102c tends to be deformed into an outwardly convex undulatory shape by springback or the like that is caused when it is worked.

The pressure of contact between the flange portion 102c and the armature 103 is liable to increase when the clutch rotor 102 and the armature 103 are connected magnetically to each other. As mentioned before, moreover, the second and third magnetic pole portions 112b and 112c have low stiffness and easily become undulatory. When the rotor 102 and the armature 103 of the electromagnetic clutch 101 are connected magnetically to each other, therefore, the rotor 102 easily undergoes self-excited vibration. Thus, the second and third magnetic pole portions 112b and 112c vibrate during clutch operation, and noise is produced depending on the level of the vibration.

BRIEF SUMMARY OF THE INVENTION

Accordingly, the object of the present invention is to provide a low-noise electromagnetic clutch subject to less vibration during clutch operation.

In order to achieve the above object, an electromagnetic clutch according to the present invention comprises a clutch rotor having a flange portion, an armature opposed to the flange portion, and an exciting coil held in the clutch rotor and adapted to form in the clutch rotor and the armature a magnetic flux for attracting the armature to the flange portion when supplied with current. The flange portion includes arcuate outside slits and arcuate inside slits, formed individually on the respective circumferences of a plurality of concentric circles, and a plurality of ring magnetic pole portions formed separated in the radial direction of the flange portion by the outside slits and the inside slits. The flange portion has a step portion and a concave surface continuous with the step portion, formed in a region corresponding to a specific one of the magnetic pole portions formed between the outside slits and the inside slits so as to be situated remoter from the armature than the other magnetic pole portions, the step portion serving to restrain the specific magnetic pole portion from touching the armature when the magnetic flux is formed.

According to the present invention, the specific magnetic pole portion of the flange portion is restrained from touching the armature in a state such that the armature is attracted to the flange portion by means of the magnetic flux generated by the exciting coil. Therefore, the magnetic pole portion of the flange portion, which has low stiffness and is liable to have an outwardly convex undulatory shape, and the armature can avoid touching each other during clutch operation. Thus, vibration of the flange portion during the clutch operation and production of noise attributable to such vibration can be restrained. In carrying out the present invention, it is to be desired that the concave surface should be formed in a region corresponding to the magnetic pole portion on the outer peripheral side, among other magnetic pole portions formed between the outside and inside slits. According to this arrangement, the region corresponding to the magnetic pole portion of the flange portion on the outer peripheral side, which is liable to vibration, never touches the armature, so that the vibration of the flange portion and the production of noise during the clutch operation can be restrained more effectively.

In order to achieve the above object, moreover, the electromagnetic clutch of the invention may be designed so that a smooth surface with surface roughness and waviness of 10 µm or less is formed in a region corresponding to the specific magnetic pole portion between the outside and inside slits, in place of the step portion and the concave surface of the flange portion. According to this invention, the specific magnetic pole portion of the flange portion touches the smooth surface in a state such that the armature is attracted to the flange portion by means of the magnetic flux generated by the exciting coil. If the magnetic pole portion of the flange portion, which has low stiffness and is liable to have an outwardly convex undulatory shape, touches the armature, therefore, exciting force that is transferred from the armature to the flange portion can be reduced, so that the vibration of the flange portion and the production of noise can be restrained. In carrying out the present invention, it is to be desired that the smooth surface should be formed in a region corresponding to the magnetic pole portion on the outer peripheral side, among other magnetic pole portions formed between the outside and inside slits. According to this arrangement, the region corresponding to the magnetic pole portion of the flange portion on the outer peripheral side, which is liable to vibration, is formed of smooth surface, so that the vibration of the flange portion and the production of noise during the clutch operation can be restrained more effectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a sectional view of a clutch rotor of an electromagnetic clutch according to a second embodiment of the invention;

FIG. 5A is a partial sectional view of the clutch rotor taken along line C—C of FIG. 4;

FIG. 5B is an enlarged sectional view schematically showing a part of a magnetic pole portion of the clutch rotor shown in FIG. 5A;

DETAILED DESCRIPTION OF THE INVENTION

Figure 1:
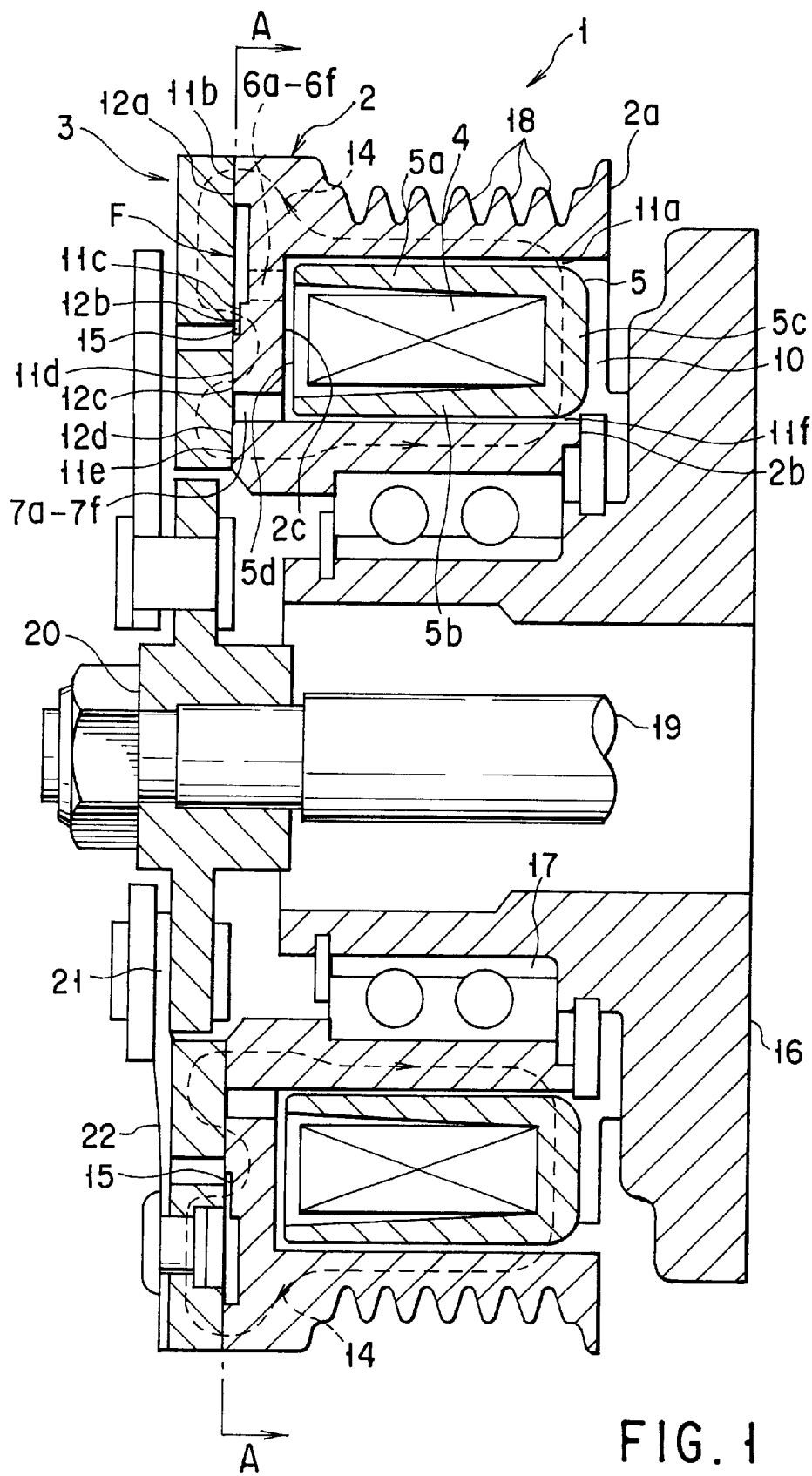
FIG. 1 is a sectional view showing an electromagnetic clutch according to a first embodiment of the present invention.

An electromagnetic clutch 1 according to a first embodiment of the present invention will now be described with reference to FIGS. 1 to 3. The electromagnetic clutch 1 shown in FIG. 1 comprises a clutch rotor 2 for use as an input unit, an armature 3 opposed to one end portion of the rotor 2, a ring exciting coil 4 that serves as an exciting element, a ring field 5, etc. The clutch rotor 2 is rotatable by means of an external drive source (not shown). The coil 4 generates a magnetic flux 14 that is used to connect or disconnect the rotor 2 and the armature 3 magnetically. The coil 4 is held in the field 5.

Figure 3:
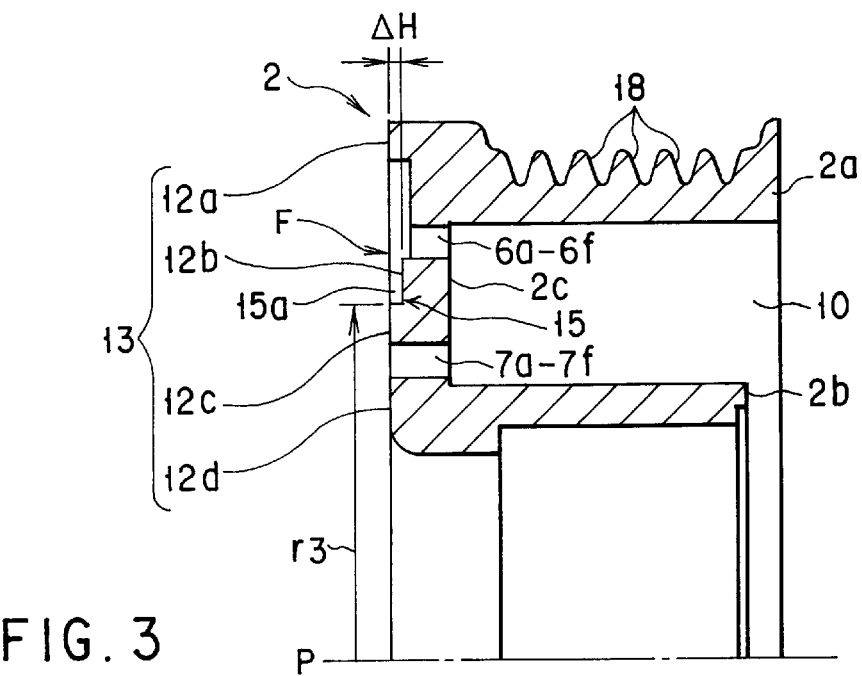
FIG. 3 is a partial sectional view of the clutch rotor taken along line B—B of FIG. 2.

As shown in FIGS. 1 and 3, the clutch rotor 2 includes a cylindrical outer tube portion 2a, an inner tube portion 2b located inside the outer tube portion 2a so as to be coaxial therewith, and a flange portion 2c that extends from one end of the inner tube portion 2b toward one end of the outer tube portion 2a. The flange portion 2c, which serves as an intermediate magnetic pole, integrally connects the one end (outer peripheral magnetic pole) of the outer tube portion 2a and the one end (inner peripheral magnetic pole) of the inner tube portion 2b. The flange portion 2c is provided on one end portion of the clutch rotor 2 that faces the armature 3. An armature junction surface 13 that serves as a frictional surface is formed on the end face of the rotor 2 that faces the armature 3.

As shown in FIG. 1, the clutch rotor 2 is rotatably mounted on the outer peripheral portion of a clutch base 16 by means of a bearing 17. The clutch base 16 is in the form of a hollow cylinder. The rotor 2 serves as an input unit of the electromagnetic clutch 1. An engaging groove 18 is provided on the outer periphery of the outer tube portion 2a of the rotor 2. The groove 18 is wound with an endless belt (not shown) that is run endlessly by means of an external drive source. The rotor 2 can be rotated by means of the external drive source with the aid of the endless belt.

Figure 2:
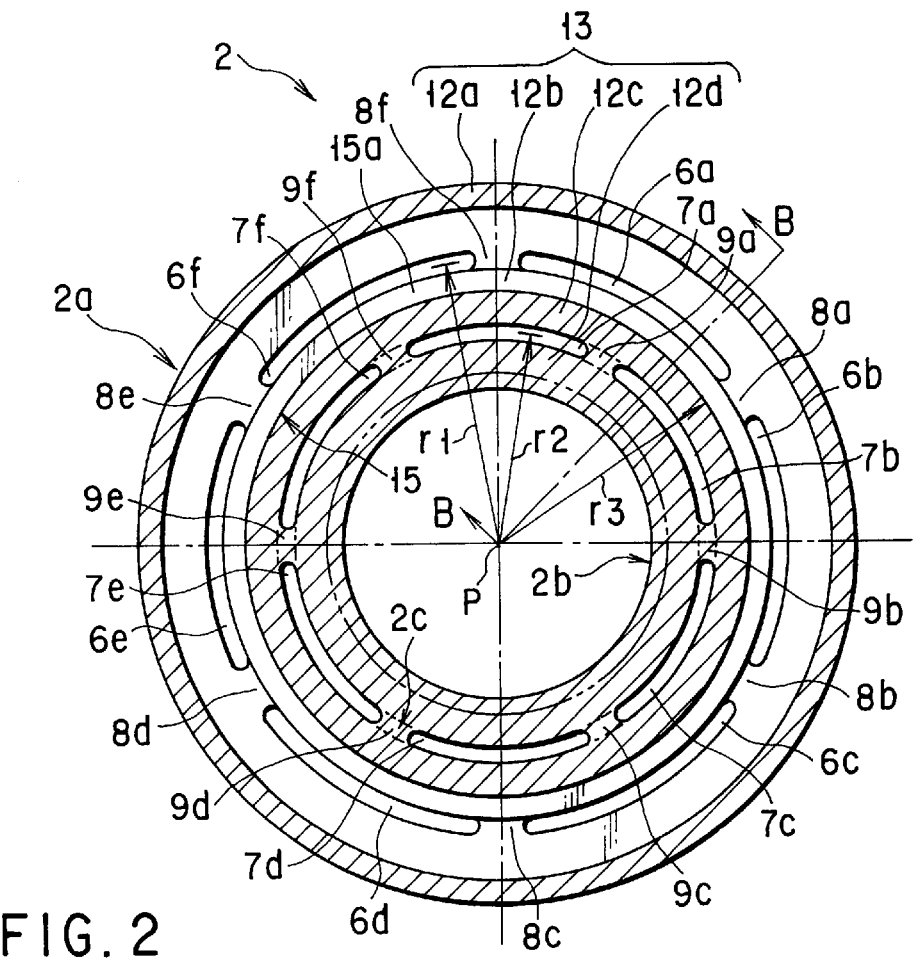
FIG. 2 is a sectional view of a clutch rotor taken along line A—A of FIG. 1.

As shown in FIG. 2, the flange portion 2c is formed having a plurality of (e.g., six) outside slits 6a, 6b, 6c, 6d, 6e and 6f and a plurality of (e.g., six) inside slits 7a, 7b, 7c, 7d, 7e and 7f. All these slits 6a to 6f and 7a to 7f penetrate the flange portion 2c and internally connect with the outside of the clutch rotor 2 and a ring groove 10. The outside slits 6a to 6f are situated individually on the circumference of a circle around a center P of the flange portion 2c, the circle having a radius r1. The slits 6a to 6f are arranged in a circular arc and at equal pitches in the circumferential direction.

The inside slits 7a to 7f are situated nearer to the center P of the flange portion 2c than the outside slits 6a to 6f are. The inside slits 7a to 7f are situated individually on the circumference of a circle around the center P of the flange portion 2c, the circle having a radius r2. The slits 7a to 7f are arranged in a circular arc and at equal pitches in the circumferential direction. Thus, the outside slits 6a to 6f and the inside slits 7a to 7f are formed on the respective circumferences of the two concentric circles with the different radii r1 an r2 so that they are kept apart from one another in the radial direction of the flange portion 2c.

Outside bridge portions 8a to 8f are arranged individually between the adjacent outside slits 6a to 6f. The outer peripheral portion of the flange portion 2c is supported on one end portion of the outer tube portion 2a by means of the bridge portions 8a to 8f. Further, inside bridge portions 9a to 9f are arranged individually between the adjacent inside slits 7a to 7f. The inner peripheral portion of the flange portion 2c is supported on one end portion of the inner tube portion 2b by means of the bridge portions 9a to 9f.

Thus, the flange portion 2c is supported on the one end portion of the outer tube portion 2a and the one end portion of the inner tube portion 2b by means of the outside and inside bridge portions 8a to 8f and 9a to 9f. With this arrangement, the flange portion 2c can maintain its strength such that the electromagnetic clutch 1 in operation can fulfill its function when the clutch rotor 2 and the armature 3 are in contact with each other.

As shown in FIG. 1, the armature 3 is in the form of a circular ring that has inside and outside diameters corresponding to one end face of the clutch rotor 2. The armature 3 is opposed to the armature junction surface 13 of the flange portion 2c on the same axis with the clutch rotor 2 and the clutch base 16. The armature 3, which is movable with respect to the rotor 2 in the axial direction thereof, can touch and leave the armature junction surface 13.

Inside the armature 3, a rotating shaft 19 for use as an output shaft is located on the same axis as the clutch base 16. The shaft 19 serves to transmit a driving force that is transmitted from the clutch rotor 2 through the armature 3, to an external driven device (not shown). A compressor of an air conditioner is an example of the driven device. A hub 20 is located inside the armature 3. The hub 20, which is fixed to the shaft 19, can rotate integrally with the shaft 19. A spring member 22 is provided between an outer peripheral portion 21 of the hub 20 and the armature 3. The spring member 22 urges the armature 3 in a direction such that the armature 3 leaves the armature junction surface 13 of the flange portion 2c.

If current is supplied to the ring exciting coil 4 through a control unit (not shown) and an external power source (not shown), the coil 4 generates the magnetic flux 14. The armature 3 is attracted to the armature junction surface 13, resisting the urging force of the spring member 22, by means of an electromagnetic force based on the magnetic flux 14. A state in which is the armature 3 is in engagement with the armature junction surface 13 is referred to as a magnetically connected state herein. FIG. 1 shows the magnetically connected state. In this state, the armature 3 can rotate together with the clutch rotor 2. Since the armature 3 is fixed to the hub 20 by means of the spring member 22, the hub 20 and the rotating shaft 19 rotate integrally with each other when the armature 3 rotates. Thus, the rotation of the clutch rotor 2 that is rotated by means of the external drive source is transmitted to the driven device through the shaft 19.

When current supply to the exciting coil 4 is interrupted, the magnetic flux 14 is canceled, so that the armature 3 is separated from the armature junction surface 13 by means of the urging force of the spring member 22. Since the aforesaid magnetically connected state is canceled, in this case, the rotation of the clutch rotor 2 ceases to be transmitted to the armature 3.

When the ring exciting coil 4 is held in the ring field 5, as shown in FIG. 1, it is inserted in the ring groove 10 of the clutch rotor 2. The groove 10 is defined by the respective inner surfaces of the outer tube portion 2a, inner tube portion 2b, and flange portion 2c of the clutch rotor 2. The magnetic flux 14 is generated if the coil 4 is supplied with a given current that is regulated by means of the control unit and the external power source. The magnetic flux 14 magnetically connects the rotor 2 and the armature 3 with given strength. In consequence, the rotor 2 and the armature 3 are in contact and in frictional engagement with each other on the armature junction surface 13 of the flange portion 2c. Thus, the turning moment of the rotating clutch rotor 2 is transmitted through the armature 3 to the driven device by means of frictional force that is generated between the rotor 2 and the armature 3.

As shown in FIG. 1, the ring field 5 includes an inner tube portion 5a, an outer tube portion 5b, and an end wall 5c. One end 5d of the field 5 is open. The field 5 is held in the ring groove 10 in a manner such that its open end 5d faces the flange portion 2c. The ring exciting coil 4, along with the field 5, is held in the groove 10 after it is inserted into the field 5 through the open end 5d.

As shown in FIG. 3, a step portion 15 is formed on a front face F of the flange portion 2c. It is formed on the front face F of the flange portion 2c so as to extend along the circumference of a circle with a radius r3 around the center P of the flange portion 2c. Bordered by the step portion 15, a ring concave surface 15a is formed in a position corresponding to a magnetic pole portion 12b, which will be mentioned later. The concave surface 15a is recessed in the thickness direction of the flange portion 2c from the front face F thereof by a margin corresponding to the height (ΔH) of the step portion 15.

When current is supplied to the ring exciting coil 4, in the electromagnetic clutch 1 constructed in this manner, the magnetic flux 14 is generated, as indicated by broken line in FIG. 1. The magnetic flux 14 magnetically connects the clutch rotor 2 and the armature 3. More specifically, the magnetic flux 14 that is generated by means of the coil 4 gets out of the ring field 5 and gets into the outer tube portion 2a through a gap 11a between the field 5 and the outer tube portion 2a. The flux 14 in the outer tube portion 2a gets into the armature 3 through a first junction 11b between the clutch rotor 2 and the armature 3. The flux 14 in the armature 3 gets into the flange portion 2c through a second junction 11c between the armature 3 and the flange portion 2c.

The magnetic flux 14 in the flange portion 2c gets again into the armature 3 through a third junction lid between the flange portion 2c and the armature 3. The third junction lid is situated on the inner peripheral side of the flange portion 2c when compared to the second junction 11c. The flux 14 having thus entered again into the armature 3 gets into the inner tube portion 2b through a fourth junction lie between the armature 3 and the inner tube portion 2b. The flux 14 in the inner tube portion 2b gets into the ring field 5 through a gap 11f between the inner tube portion 2b and the field 5. The flux 14 thus returned to the field 5 joins the flux 14 that is generated by means of the coil 4 in the field 5, thereby forming a closed magnetic circuit.

In this magnetic circuit, a plurality of ring magnetic pole portions 12a to 12b are formed on the armature junction surface 13 of the flange portion 2c, successively ranging from the outer peripheral side to the inner peripheral side in the radial direction of the flange portion 2c, as shown in FIGS. 2 and 3. In the present embodiment, the first, second, third, and fourth magnetic pole portions 12a, 12b, 12c and 12d are formed successively ranging from the outer peripheral side to the inner peripheral side of the flange portion 2c. Both the second and third magnetic pole portions 12b and 12c are formed between the outside slits 6a to 6f and the inside slits 7a to 7f.

The concave surface 15a is formed in a region corresponding to the second magnetic pole portion 12b, out of the four magnetic pole portions 12a, 12b, 12c and 12d. Bordered by the step portion 15, the concave surface 15a is recessed to be kept at a distance corresponding to the height ΔH of the step portion 15 from the armature 3. The other magnetic pole portions 12a, 12c and 12d are substantially flush with the front face F of the flange portion 2c.

As the concave surface 15a is formed on the flange portion 2c in this manner, the position of the second magnetic pole portion 12b, compared with the other magnetic pole portions 12a, 12c and 12d, is shifted away from the armature 3 in the axial direction of the clutch rotor 2. This shift (height ΔH of the step portion 15) has a value such that the second magnetic pole portion 12b never touches the armature 3 if the flange portion 2c is excited by means of the armature 3 with the electromagnetic clutch 1 worked, that is, with the clutch rotor 2 and the armature 3 connected magnetically to each other.

According to the electromagnetic clutch 1 constructed in this manner, contact between the second magnetic pole portion 12b and the armature 3 can be avoided if the rotating clutch rotor 2 and the armature 3 are connected magnetically to each other during the operation of the clutch 1. Accordingly, the second magnetic pole portion 12b can avoid running against the armature 3 if the low-stiffness flange portion 2c, which is supported by means of the outside and inside bridge portions 8a to 8f and 9a to 9f, is excited to vibrate as it touches the armature 3. The other magnetic pole portions 12a, 12c and 12d are in contact with the armature 3. Thus, production of noise attributable to self-excited vibration of the rotor 2 can be restrained without ruining the frictional force that is generated between the rotor 2 and the armature 3, that is, without failing to secure the function of the clutch.

An electromagnetic clutch 31 according to a second embodiment of the invention will now be described with reference to FIGS. 4 to 6. This electromagnetic clutch 31, like the one according to the first embodiment, comprises a clutch rotor 32 that has a flange portion 32c. The shape of the flange portion 32c is different from that of the flange portion 2c of the first embodiment. Except for the flange portion 32c, the second embodiment shares the construction, function, and effect with the first embodiment. Therefore, the following is a description of only different portions, and a description of other portions is omitted. Further, the second embodiment will be described with reference to only FIGS. 4, 5A and 5B that illustrate the clutch rotor 32 of the second embodiment, without using drawings that are common to the first and second embodiments. Like reference numerals are used to designate like or common portions throughout the drawings.

The electromagnetic clutch 31 of the second embodiment, like the one according to the first embodiment, is designed so that ring magnetic pole portions 12a, 12b, 12c and 12d are formed on an armature junction surface 13, ranging from the outer peripheral side to the inner peripheral side of the flange portion 32c, when current is supplied to a ring exciting coil (corresponding to the exciting coil 4 shown in FIG. 1). The flange portion 32c is formed having a smooth surface S in a region corresponding to the second magnetic pole portion 12b. The second magnetic pole portion 12b, which is formed of the smooth surface S, is situated on the same plane with the other magnetic pole portions 12a, 12c and 12d, that is, on a front face F of the flange portion 32c, as shown in FIG. 5A. Microscopically, the smooth surface S has projections 40 and depressions 41, as is diametrically shown in FIG. 5B. In the case of this embodiment, the surface S is finished so that its surface roughness and waviness are 10 μm or less.

The "surface roughness" used herein is based on Japanese Industrial Standard (JISB0601). More specifically, it is arithmetic roughness determined for a plurality of points of measurement within a reference length of the surface to be measured. For example, ten-point mean roughness (Rz) is used for the surface roughness. The ten-point mean roughness (Rz) is a value in micrometers (μm) that represents the difference between the average of the respective heights R1 of the first to fifth highest projections and the average of the respective heights R2 of the first to fifth deepest depressions in each point of measurement. The waviness, which is referred to also as flatness, is the difference (tolerance) between two parallel planes that contains surfaces to be measured.

The electromagnetic clutch 31 according to the second embodiment is similar to the electromagnetic clutch 1 of the first embodiment except for the different points described above, and can solve the aforementioned problems of the invention. Provided with the clutch rotor 32, moreover, the electromagnetic clutch 31 of the second embodiment can display its performance that involves the following details.

The second magnetic pole portion 12b of the second embodiment is formed flush with the first, third, and fourth magnetic pole portions 12a, 12c and 12d on the armature junction surface 13. When the clutch rotor 32 and an armature (corresponding to the armature 3 shown in FIG. 1) connected magnetically to each other, therefore, all the magnetic pole portions 12a to 12d are in contact with the armature. Thus, frictional force is also generated between the second magnetic pole portion 12b and the armature. Since allowable values for the surface roughness and waviness of the smooth surface S on the second magnetic pole portion 12b are adjusted to 10 μm or less, moreover, the rotor 32 and the armature can enjoy good adaptability to each other without failing to secure frictional force between them. In consequence, frictional resistance and slipperiness between the respective contact surfaces of the clutch rotor 32 and the armature can be balanced, and the second magnetic pole portion 12b can be restrained from producing vibratory noise (self-excited vibration of the rotor 32).

Figure 6:
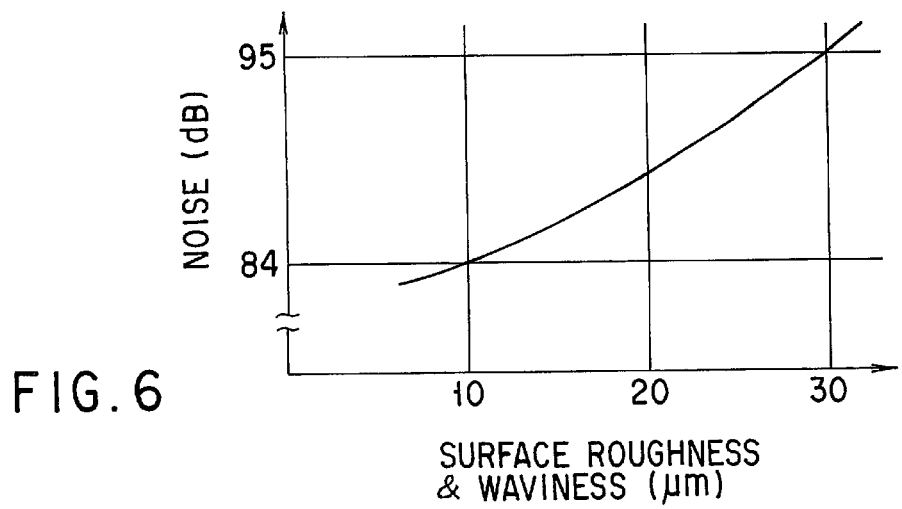
FIG. 6 is a diagram showing the relation between the surface roughness and waviness of the magnetic pole portion of the clutch rotor shown in FIG. 5A and noise level.
Figure 7:
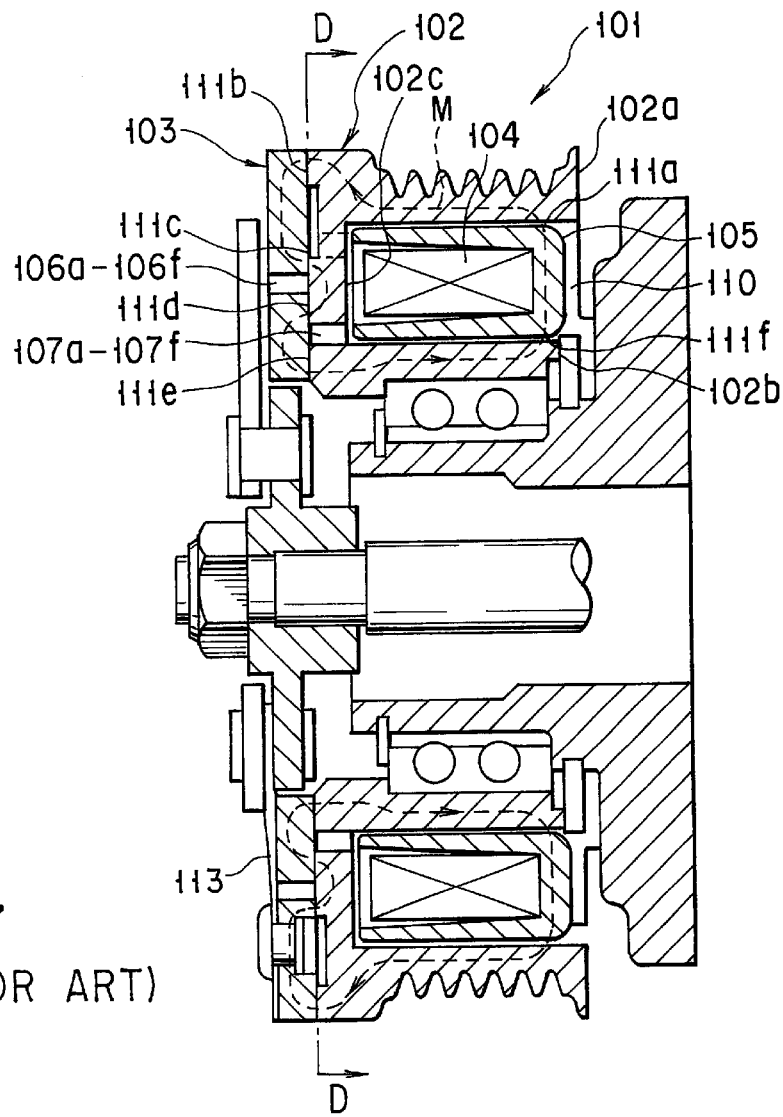
FIG. 7 is a sectional view showing a conventional electromagnetic clutch.
Figure 8:
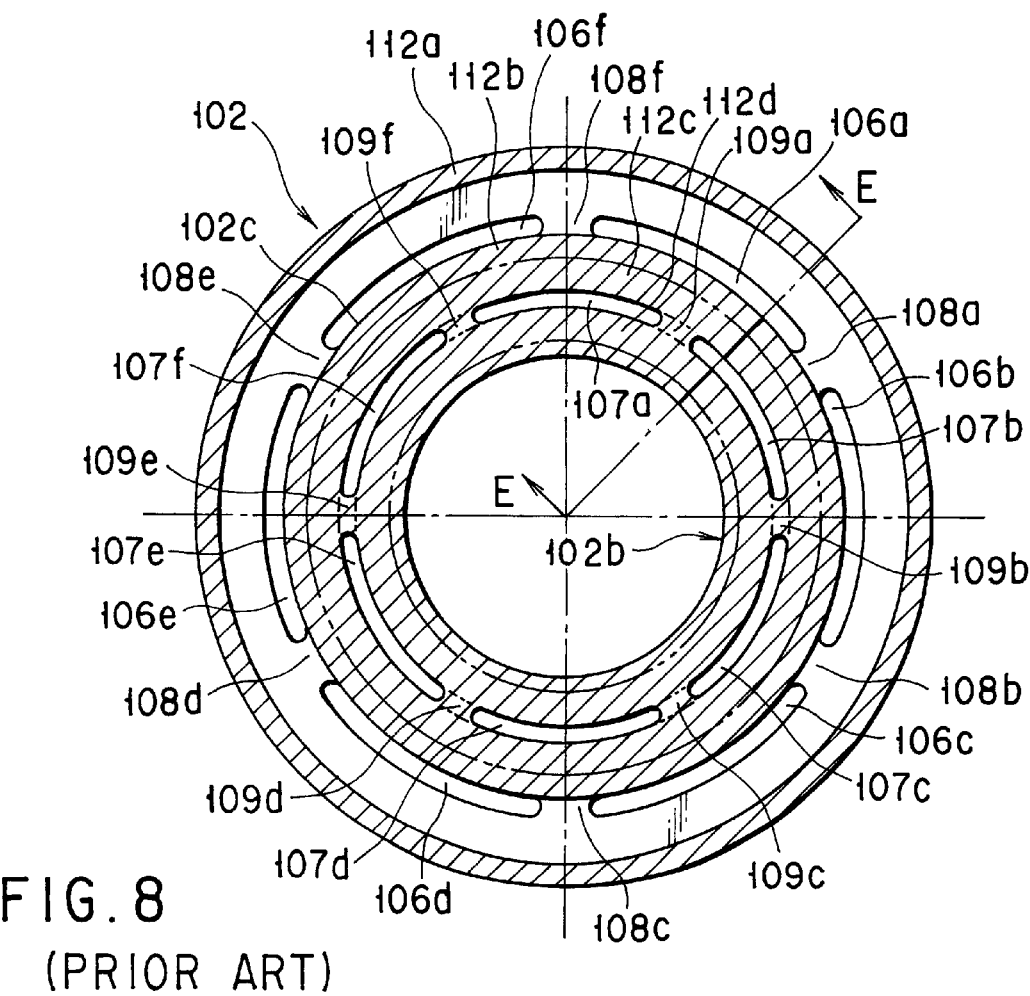
FIG. 8 is a sectional view of a clutch rotor taken along line D—D of FIG. 7.
Figure 9:
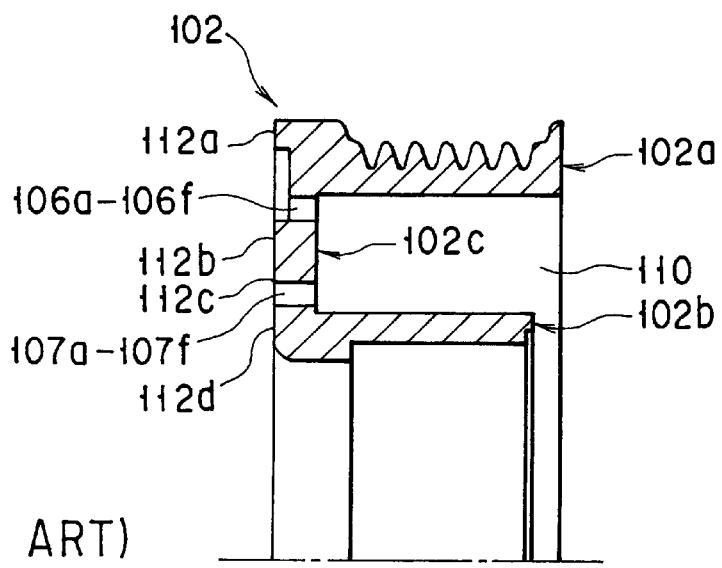
FIG. 9 is a partial sectional view of the clutch rotor taken along line E—E of FIG. 8.

FIG. 6 shows the relation between the surface roughness and waviness of the second magnetic pole portion 12b and noise level. If the allowable values for the surface roughness and waviness of the second magnetic pole portion 12b exceeds 10 μm, as shown in FIG. 6, the operating noise of the electromagnetic clutch 31 (self-excited vibration of the rotor) increases correspondingly. Thus, noise produced when the clutch rotor 32 and the armature are connected magnetically to each other is loud. It is confirmed, on the other hand, that the clutch operating noise can be suppressed to a satisfactory value of 84 dB or less if the allowable values for the surface roughness and waviness of the second magnetic pole portion 12b is 10 μm or less.

The electromagnetic clutch of the present invention is not limited to the first and second embodiments described above. As regards the step portion 15 and the concave surface 15a described in connection with the first embodiment, for example, the concave surface 15a may be formed on the third magnetic pole portion 12c in place of the second magnetic pole portion 12b. Further, the smooth surface S described in connection with the second embodiment may be formed on the third magnetic pole portion 12c in place of the second magnetic pole portion 12b. Only if the self-excited vibration of the armature junction surface 13 can be restrained without failing to keep the frictional resistance between the clutch rotor and the armature at a given value, the concave surface 15a or the smooth surface S may be formed on a part of the second or third magnetic pole portion 12b or 12c in the circumferential direction. Alternatively, the whole front face F of the flange portion 32c that functions as the armature junction surface 13 may be worked so that allowable values for its surface roughness and waviness are as high as those of the smooth surface S. Alternatively, moreover, the front face F of the flange portion 32c (armature junction surface 13) may be coated with a material that is more slippery than metal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electromagnetic clutch comprising:
    a clutch rotor having a flange portion;
    an armature opposed to the flange portion; and
    an exciting coil held in the clutch rotor and adapted to form in the clutch rotor and the armature a magnetic flux for attaching the armature to the flange portion when supplied with current,
    the flange portion including arcuate outside slits and arcuate inside slits, formed individually on the respective circumferences of a plurality of concentric circles, and a plurality of magnetic pole portions defined in the radial direction of the flange portion by the outside slits and the inside slits,
    the flange portion having a step portion and a concave surface continuous with the step portion, formed in a region corresponding to a specific one of the magnetic pole portions formed between the outside slits and the inside slits so as to be situated more remote from the armature than the other magnetic pole portions, the step portion serving to restrain the specific magnetic pole portion from touching the armature when the magnetic flux is formed.

2. An electromagnetic clutch according to claim 1, wherein a magnetic pole portion on the outer peripheral side and a magnetic pole portion on the inner peripheral side are formed between the outside slits and the inside slits, and said concave surface is formed in a region corresponding to the magnetic pole portion on the outer peripheral side.

3. An electromagnetic clutch according to claim 1, wherein said specific magnetic pole portion is the second magnetic pole portion, among other magnetic pole portions, as counted from the outer peripheral of the flange portion.

4. An electromagnetic clutch comprising:
    a clutch rotor having a flange portion;
    an armature opposed to the flange portion; and
    an exciting coil held in the clutch rotor and adapted to form in the clutch rotor and the armature a magnetic flux for attracting the armature to the flange portion when supplied with current,
    the flange portion including arcuate outside slits and arcuate inside slits, formed individually on the respective circumferences of the plurality of concentric circles, and a plurality of magnetic pole portions defined in the radial direction of the flange portion by the outside slits and the inside slits,
    the flange portion having a smooth surface with waviness of 10 μm or less, formed in a region corresponding to a specific one of the magnetic pole portions formed between the outside slits and the inside slits.

5. An electromagnetic clutch according to claim 4, wherein a magnetic pole portion on the outer peripheral side and a magnetic pole portion on the inner peripheral side are formed between the outside slits and the inside slits, and said smooth surface is formed in a region corresponding to the magnetic pole portion on the outer peripheral side.

6. An electromagnetic clutch according to claim 4, wherein said specific magnetic pole portion is the second magnetic pole portion, among other magnetic pole portions, as counted from the outer peripheral of the flange portion.

* * * * *